Patented May 16, 1950

2,507,802

UNITED STATES PATENT OFFICE 2,507,802

PRODUCTION OF DIMETHYLAMINO VITAMIN A

Nicholas A. Milas, Belmont, Mass., assignor to Research Corporation, New York, N. Y., a corporation of New York No Drawing. Application November 22, 1946, Serial No. 711,815

2 Claims. (Cl. 260—563)

This application is a continuation-in-part of my application Serial No. 540,002, filed June 12, 1944, now Patent No. 2,415,834, which discloses the preparation of dimethylamino vitamin A

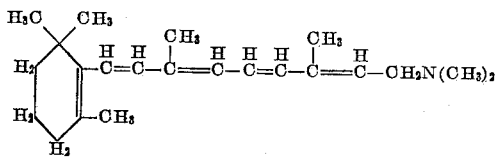

*Compound I* by the dehydration or halogenation and dehydrohalogenation of compounds of the formulae

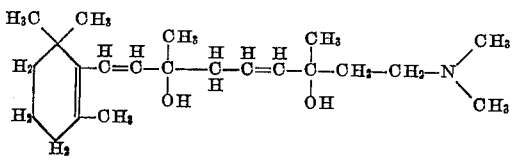

*Compound IXa* and

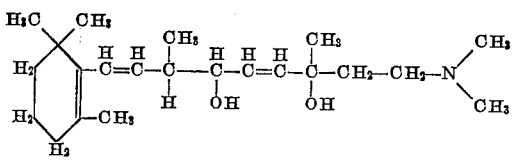

*Compound IX*

The preparation of the above compounds IX and IXa is described in detail in said Patent No. 2,415,834. It is sufficient to state here that one of the starting materials for the preparation of compounds IX and IXa according to the method disclosed in said Patent No. 2,415,834 is dimethylamino-1 butanone-3

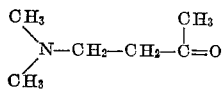

and that by the use of homologs thereof in which the two amino methyl groups are substituted by other alkyl, aryl or aralkyl groups, corresponding homologs of compounds IX, IXa and of the dimethylamino vitamin A may be prepared. Thus, by substituting other dialkyl, diaryl, and diaralkyl-amine hydrochlorides for dimethylamine hydrochloride in the following method for the preparation of dimethylamino-1 butanone-3, one may prepare compounds embraced by the general formula

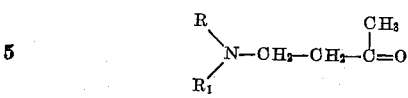

in which R and $R_1$ stand for monovalent hydrocarbon groups such as alkyl, aryl and aralkyl and by the use of such compounds as starting materials may prepare compounds of the formulae

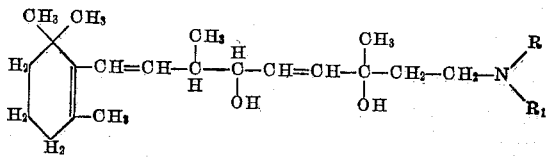

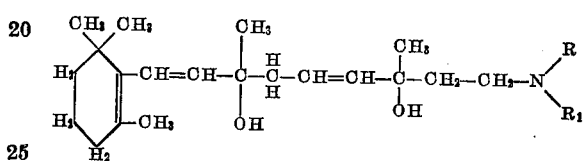

and

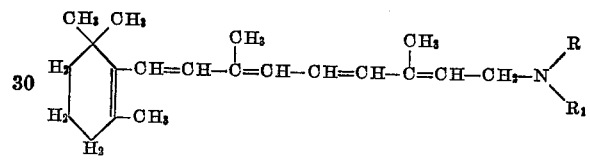

in all of which R and $R_1$ have the significance defined above.

Compounds IX and IXa and their homologs are dehydrated, using, for example, anhydrous copper sulfate as the dehydrating agent, or halogenation and dehydrohalogenated by allowing them to react with phosphorus trichloride or phosphorus tribromide or thionyl chloride and treating the resulting dihalide with alcoholic potash to form the dimethylamino vitamin A and its homologs. In the bromination and dehydrobromination of compounds IX and IXa and their homologs there is a small loss due to the decomposition of a complex formed between the phosphorus halide or thionyl chloride and said compounds. This loss can be prevented by first forming the hydrobromide or hydrochloride salt of said compounds by allowing them to interact in a non-aqueous solvent with pyridine hydrobromide or hydrochloride. When these salts are used the halogenation and dehydrohalogenation proceeds smoothly.

The preparation of dimethylamino vitamin A is illustrated by the following specific example:

27.8 g. of the dimethylaminoglycol (compound IX or IXa) was dissolved in 80 cc. of dry benzene and treated with 15.1 g. of crystalline pyridine hydrobromide. The mixture was allowed to stand in an atmosphere of nitrogen for twenty-four hours then cooled to 0° and treated with 43 g. of phosphorus tribromide. The mixture was allowed to warm up slowly to room temperature then heated in an atmosphere of nitrogen for one hour. The mixture became dark-brown, almost red. The benzene was then removed under reduced pressure and the residue treated with 77 g. of potassium hydroxide in 770 cc. of 95% ethanol. The mixture was heated on the water bath (in nitrogen) to 70–80° for one hour, then most of the alcohol removed under reduced pressure, the residual liquid diluted with five times its volume of water and extracted with 8×200 cc. of petroleum ether. The combined petroleum ether extracts were shaken with 3×100 cc. of 5% phosphoric acid. This last step extracted all of the dimethylamino vitamin A leaving only 0.7 to 0.8 g. residue in the petroleum ether (after petroleum ether was removed and the residue weighed). This residue gave a strong blue color with antimony trichloride in chloroform.

The combined phosphoric acid extracts were cooled to 0° and treated with excess solid potassium hydroxide, and the amine liberated extracted with 500 cc. petroleum ether. The petroleum ether extract was washed twice with water, then dried first with solid potassium hydroxide, then overnight with anhydrous barium oxide. After filtration of the mixture and removal of petroleum ether, the residue was subjected to a high vacuum at 50–60° for one hour to remove traces of pyridine. The crude dimethylamino vitamin A had the following analysis: A.H (Zer.), 0.1–0.2 (calcd. O); unsaturation, 4.3 F (calcd. 5.0). It exhibited an ultra-violet spectrum with a maximum at 3240 Å. (vitamin A, 3250 Å). It gave a strong blue color with antimony trichloride in chloroform.

I claim:

1. As a new product a compound of the formula

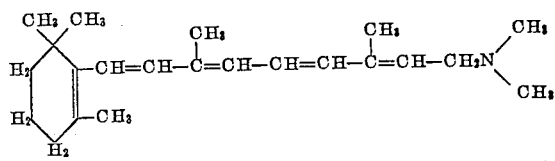

2. Process for the production of the compound of the formula

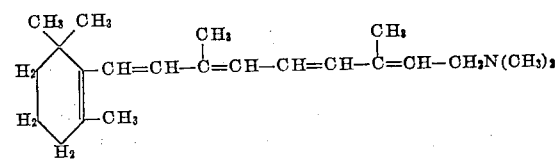

comprising the steps of halogenating a compound of the formula

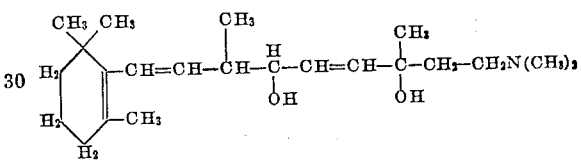

and dehydrohalogenating the resulting compound.

NICHOLAS A. MILAS.

No references cited.